United States Patent
Karl et al.

(10) Patent No.: US 7,042,984 B2
(45) Date of Patent: May 9, 2006

(54) METHOD FOR INSPECTING TRANSMISSION CHANNELS IN A COMMUNICATIONS SYSTEM HAVING PERIPHERAL MODULES

(75) Inventors: Michael-Wilhelm Karl, Taufkirchen (DE); Gottfried Silberhorn, München (DE)

(73) Assignee: Siemens Aktiengesellschaft, Munich (DE)

( * ) Notice: Subject to any disclaimer, the term of this patent is extended or adjusted under 35 U.S.C. 154(b) by 333 days.

(21) Appl. No.: 10/311,257

(22) PCT Filed: Jun. 12, 2001

(86) PCT No.: PCT/DE01/02173

§ 371 (c)(1),
(2), (4) Date: Apr. 18, 2003

(87) PCT Pub. No.: WO01/97534

PCT Pub. Date: Dec. 20, 2001

(65) Prior Publication Data

US 2003/0161445 A1   Aug. 28, 2003

(30) Foreign Application Priority Data

Jun. 14, 2000  (DE) ................. 100 29 272

(51) Int. Cl.
*H04M 1/24* (2006.01)
(52) U.S. Cl. ............... 379/2; 379/12; 379/22; 379/22.01
(58) Field of Classification Search ........... 379/10.01, 379/10.02, 18, 22.02, 25, 26.01, 27.01, 27.02, 379/1.01, 2, 9, 9.06, 14, 14.01, 12, 22, 22.01, 379/22.03
See application file for complete search history.

(56) References Cited

U.S. PATENT DOCUMENTS

| | | | |
|---|---|---|---|
| 4,017,829 A | | 4/1977 | Sternat |
| 4,138,599 A | * | 2/1979 | Munter ................. 714/819 |
| 4,736,402 A | * | 4/1988 | Landis .................. 379/16 |
| 5,018,184 A | * | 5/1991 | Abrams et al. ......... 379/29.05 |
| 5,553,059 A | * | 9/1996 | Emerson et al. ......... 370/248 |
| 5,579,369 A | * | 11/1996 | Feiner et al. ........... 379/22 |
| 5,818,904 A | * | 10/1998 | Dean .................. 379/22 |

FOREIGN PATENT DOCUMENTS

| | | |
|---|---|---|
| DE | 19 54 320 | 5/1971 |
| DE | 24 23 260 | 11/1975 |
| DE | 25 27 888 | 12/1976 |
| DE | 33 35 380 | 4/1985 |
| EP | 0 143 255 | 6/1989 |
| EP | 399 359 | 11/1990 |

* cited by examiner

Primary Examiner—Rexford Barnie
(74) Attorney, Agent, or Firm—Staas & Halsey LLP

(57) ABSTRACT

Transmission channels indicated as occupied in a communications system having peripheral modules are inspected for preparing subscriber-side transmission channels. A test sequence transmitter on the system side transmits a test sequence to a control unit for a selected peripheral module. The test sequence is transmitted to a test sequence receiver over a transmission channel, which is indicated as occupied and which is assigned to the peripheral module. The test sequence, which is transmitted by the test sequence transmitter, and the test sequence, which is received by the test sequence receiver, are inspected for an evaluation of conformity. In the instance of non-conformity, the selected transmission channel is disconnected in a targeted manner.

8 Claims, 2 Drawing Sheets

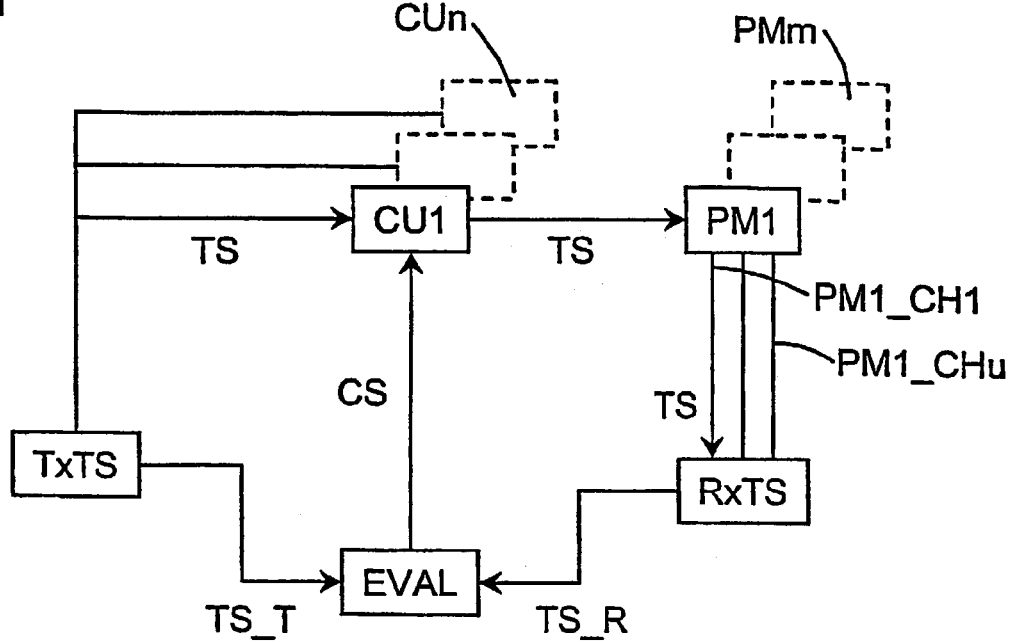
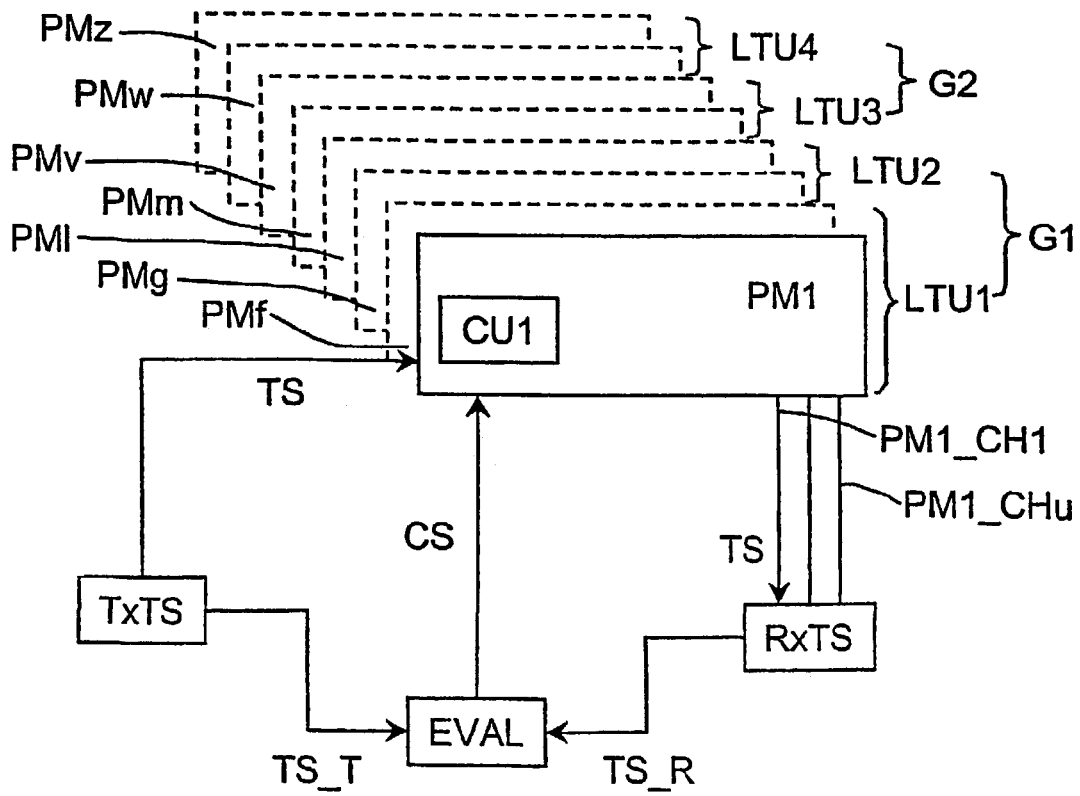

METHOD FOR INSPECTING TRANSMISSION CHANNELS IN A COMMUNICATIONS SYSTEM HAVING PERIPHERAL MODULES

CROSS REFERENCE TO RELATED APPLICATIONS

This application is based on and hereby claims priority to German Application No. 100 29 272.0 filed on Jun. 14, 2000, the contents of which are hereby incorporated by reference.

BACKGROUND OF THE INVENTION

Peripheral modules are used for forming an interface between a communications system and subscriber lines. A plurality of peripheral modules is combined in respect of functions and construction to form a line/trunk unit. Depending on the size of the communications system, the line/trunk units can in turn be combined to form line/trunk groups and are connected by way of voice and data multiplex channels with a switching network as the core component of a communications system. In a central control unit of a communications system, call processing is performed by the system software. The peripheral modules have a module control unit whose task consists in the assignment of occupied subscriber-side transmission channels to selected channels of multiplex channels. The control functions of the module control unit are principally implemented by software.

Half paths or double connections can come about as a result of errors in the module software or in the switching system. In the case of half paths, only one of two transmission channels is switched through for a voice connection between two subscriber lines, with the result that the subscribers concerned can either only hear or only speak and no conversation is therefore possible. In the case of double connections, a pair of subscriber lines is assigned in each case to one message source or to one message sink. Problems of this type occur particularly in the case of communications systems in which switching network multiplex channels are connected to subscriber-side transmission channels of the peripheral modules and are assigned by way of a flexible transmission channel assignment method.

These problems are also encountered when distributed control units are used for the connection or disconnection of connection paths between end points of a communications system.

Incorrect settings in the call-handling units can only be diagnosed and localized with difficulty, not least on account of their sporadic occurrence. Connection paths through the switching network and subscriber-side transmission channels which are to be selected are normally ascertained and stored centrally by database access routines. Settings messages are used to forward associated connection path settings data to executing distributed control units. The connection path settings data is entered in separate main memories by the executing control units. In the case of further settings being made, changeovers occurring or operations being initiated, the connection path settings data is for example read out in order to produce settings messages which are in turn transmitted to peripheral modules. In the execution chain outlined, connection path data can become corrupted, as a result of which the aforementioned fault situations can arise. This means, for example, that transmission channels indicated in a database as capable of being occupied have not yet been disconnected in a targeted manner for a new occupation but have been assigned again without targeted disconnection.

To date, problems of this type have been resolved following a report of a disrupted connection by a subscriber by localizing the cause of the malfunction to particular peripheral modules and powering down the assigned communications system and powering it back up again by a hardware restart. This type of procedure involves the disadvantage that when such a malfunction occurs all the subscriber lines within a communications system are affected by fault recovery measures of this type.

SUMMARY OF THE INVENTION

An object of the present invention is to state a method for the more effective determination of malfunctions with regard to connection path settings faults in call-handling facilities of a communications system.

An important aspect of the method according to the invention is that the fact that transmission channels which, for example, are incorrectly indicated in a database as capable of being occupied can be localized in a targeted manner and disconnected in a targeted manner for a new occupation. With regard to the method according to the invention, this is achieved by the fact that a test sequence transmitter carries out a system-side transmission of a test sequence to a control unit for a selected peripheral module. The test sequence is then transmitted to a test sequence receiver by way of a transmission channel assigned to the peripheral module and indicated as capable of being occupied. The test sequence transmitted by the test sequence transmitter and the test sequence received by the test sequence receiver are finally inspected for an evaluation of conformity. In the event of non-conformity, the selected transmission channel is disconnected in a targeted manner. The method according to the invention can generally be used in communications systems, for example by an inspection which runs routinely and does not disrupt normal operation, or by a targeted inspection request for selected peripheral modules.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a block diagram of a communication system including a test sequence transmitter, a control unit for a peripheral module, a peripheral module, a test sequence receiver and an evaluation unit to illustrate the mode of operation of the method according to the invention, FIG. 2 is a modified variant of the system illustrated in FIG. 1 which includes a control unit integrated into a peripheral module.

DETAILED DESCRIPTION OF THE PREFERRED EMBODIMENT

Figure 3:
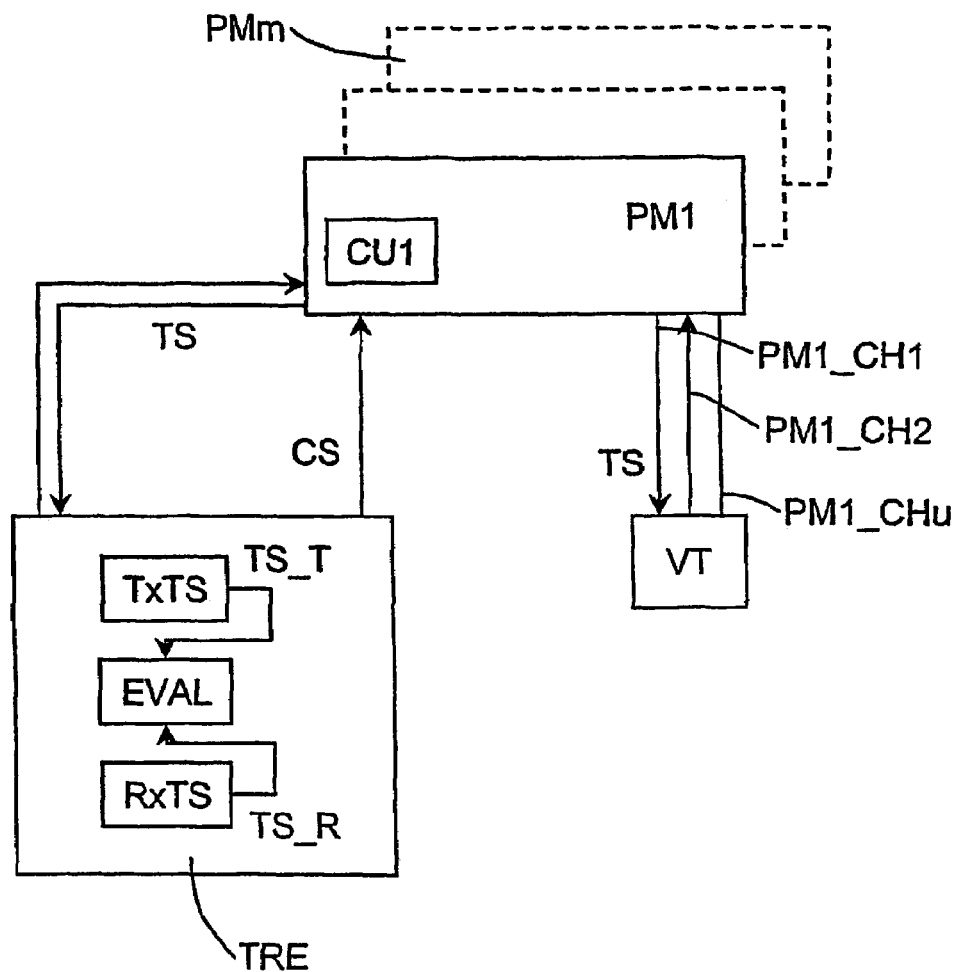
FIG. 3 is a further modified variant of the system illustrated in FIG. 1 which includes a control unit integrated into a peripheral module and an integrated inspection facility.

Reference will now be made in detail to the preferred embodiments of the present invention, examples of which are illustrated in the accompanying drawings, wherein like reference numerals refer to like elements throughout.

A system including a test sequence transmitter TxTS, a plurality of peripheral modules PM1 to PMn, a plurality of control units CU1 to CUn for peripheral modules, a test sequence receiver RxTS and an evaluation unit EVAL is illustrated in FIG. 1. A test sequence TS is transmitted by the test sequence transmitter TxTS to a control unit CU1 of a selected peripheral module PM1. The test sequence TS is then forwarded from the control unit CU1 to the peripheral module PM1. A plurality of peripheral transmission channels PM1_CH1 to PM1_CHu is assigned to the peripheral module PM1. One transmission channel PM1_CH1 is selected from these transmission channels for an inspection. This transmission channel has previously been indicated as capable of being occupied in a database (not shown in greater detail) of a communications system.

The test sequence TS is now transmitted by way of the selected subscriber-side transmission channel PM1_CH1 to the test sequence receiver RxTS. In the evaluation unit EVAL, the test sequence TS_T transmitted by the test sequence receiver TxTS and the test sequence TS_R received by the test sequence receiver RxTS are inspected for conformity. The test sequence TS is implemented for example by a bit pattern string whose value represents the address of the module and information which identifies the selected transmission channel. The search for a connection path settings error in a communications system is considerably simplified by this means. If the transmitted test sequence TS_T does not match the received test sequence TS_R, then the selected transmission channel PM1_CH1 is disconnected in a targeted manner by an operating instruction. If the transmitted test sequence TS_T matches the received test sequence TS_R, then the information stored in the database with reference to the capability of the selected transmission channel TM1_CH1 to be occupied is correct, with the result that targeted disconnection by an operating instruction CS to the control unit CU1 for the selected peripheral module PM1 is no longer required.

With regard to the system illustrated in FIG. 2, the control unit CU1 is integrated directly into the selected peripheral module PM1. This means that the test sequence TS is transmitted directly from the test sequence transmitter TxTS to the selected peripheral module PM1 and is mirrored by the latter to the test sequence receiver RxTS by way of the transmission channel PM1_CH1 which is to be inspected.

In the case of a communications system having a plurality of line/trunk unit groups with line/trunk units LTU1 to LTU4 organized into a plurality of line/trunk unit groups G1 and G2, peripheral modules PM1 to PMf, PMg to PMl, PMm to PMv, PMw to PMz being assigned to line/trunk units LTU1 to LTU4, one peripheral module is advantageously selected for an inspection for each line/trunk unit group G1 and G2 respectively. By preference, a peripheral module is selected repeatedly for inspection purposes in accordance with a defined schedule.

With regard to peripheral modules having a plurality of subscriber line facilities (not shown in greater detail), the transmission channels can be assigned to the subscriber line facilities or can be managed by these. By preference, an item of address information identifying the peripheral module in question is transmitted with the test sequence to the test sequence receiver by way of a transmission channel assigned to the subscriber line facilities in each case. If an item of information which identifies a type of inspection is additionally transmitted with the test sequence, then it is possible to differentiate between inspections directed at peripheral modules and inspections directed at subscriber line facilities.

FIG. 3 shows a further variant of the system illustrated in FIG. 1, in which the test sequence transmitter TxTS, the test sequence receiver RxTS and the evaluation unit EVAL are combined in a test device TRE. In similar fashion to the system shown in FIG. 2, in the system illustrated in FIG. 3 the control unit CU1 is integrated into the assigned peripheral module PM1. In the system shown in FIG. 3, the test sequence TS is transmitted from the test device TRE to the selected peripheral module PM1. Subsequently the test sequence TS is transmitted from the peripheral module PM1 by way of a selected transmission channel PM1_CH1, which can be indicated as capable of being occupied, to a virtual subscriber line VT and from this by way of a further transmission channel PM1_CH2 initially to the selected peripheral module PM1 and then mirrored back to the test device TRE. The evaluation in the evaluation unit EVAL of the test sequence TS_T transmitted by the test sequence transmitter TxTS and the test sequence TS_R received by the test sequence receiver RxTS takes place in the case of the system-side arrangement of the test sequence receiver RxTS described in FIG. 3 in accordance with the situations described above.

The invention has been described in detail with particular reference to preferred embodiments thereof and examples, but it will be understood that variations and modifications can be effected within the spirit and scope of the invention.

The invention claimed is:

1. A method for inspecting transmission channels indicated as capable of being occupied in a communications system having peripheral modules for preparing subscriber-side transmission channels, comprising:

transmitting a test sequence from a system-side test sequence transmitter to a control unit for a selected peripheral module via a transmission channel assigned to the peripheral module and indicated as capable of being occupied;

inspecting the test sequence as transmitted by the system test sequence transmitter and the test sequence as received by a test sequence receiver for evaluation of conformity; and disconnecting the transmission channel in a targeted manner if non-conformity is detected.

2. A method according to claim 1, further comprising transmitting the test sequence by way of a further transmission channel to the test sequence receiver when the test sequence receiver is a system-side test sequence receiver.

3. A method according to claim 2, wherein the communications system includes line/trunk units organized into a plurality of line/trunk unit groups, with peripheral modules assigned to the line/trunk units, and wherein said method further comprises selecting one peripheral module for an inspection for each line/trunk unit group, respectively.

4. A method according to claim 3, further comprising repeatedly selecting the peripheral modules for inspection in accordance with a schedule.

5. A method according to claim 4, wherein said transmitting includes transmitting an item of address information identifying the selected peripheral module with the test sequence to the test sequence receiver via the transmission channel assigned to the selected peripheral module.

6. A method according to claim 5, wherein in the peripheral module has a plurality of subscriber line facilities, and wherein said transmitting of the test sequence to the test sequence receiver is via the further transmission channel assigned to the subscriber line facilities, respectively.

7. A method according to claim 6, wherein said transmitting includes an item of address information identifying the selected peripheral module with the test sequence to the test sequence receiver by way of a transmission channel assigned to the subscriber line facilities, respectively.

8. A method according to claim 7, wherein said transmitting includes an item of information identifying a type of inspection with the test sequence to differentiate between inspections directed at peripheral modules and inspections directed at subscriber line facilities.

* * * * *